(12) United States Patent
Renz et al.

(10) Patent No.: US 11,034,220 B2
(45) Date of Patent: Jun. 15, 2021

(54) PROTECTIVE DEVICE FOR A VEHICLE INTERIOR

(71) Applicants: Günter Renz, Ditzingen (DE); Karl-Heinz Winter, Waiblingen (DE)

(72) Inventors: Günter Renz, Ditzingen (DE); Karl-Heinz Winter, Waiblingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 290 days.

(21) Appl. No.: 16/019,926

(22) Filed: Jun. 27, 2018

(65) Prior Publication Data

US 2019/0009656 A1    Jan. 10, 2019

(30) Foreign Application Priority Data

Jul. 10, 2017    (DE) .................... 10 2017 211 784.2

(51) Int. Cl.
*B60J 7/00* (2006.01)
*B60J 1/20* (2006.01)
*B60J 7/043* (2006.01)

(52) U.S. Cl.
CPC .......... *B60J 7/0015* (2013.01); *B60J 1/2052* (2013.01); *B60J 1/2044* (2013.01); *B60J 1/2061* (2013.01)

(58) Field of Classification Search
CPC ...... B60J 7/0015; B60J 1/2052; B60J 1/2061; B60J 1/2044; B60J 1/20; B60J 7/043
(Continued)

(56) References Cited

U.S. PATENT DOCUMENTS 6,491,332 B2    12/2002    De Ceuster
9,004,146 B2    4/2015     Zeo et al.
(Continued)

FOREIGN PATENT DOCUMENTS

DE         101 13 621 C1      10/2002
DE    10 2006 017 538 A1      10/2007
(Continued)

OTHER PUBLICATIONS

Office Action of German Patent Office issued in Application No. 10 2017 211 784.2 dated Apr. 10, 2018 (6 pages).
(Continued)

*Primary Examiner* — Justin V Lewis
(74) *Attorney, Agent, or Firm* — Flynn Thiel, P.C.

(57) ABSTRACT

A protective device including a flexible fabric shiftable longitudinally between different functional positions, and provided on opposite side edges with respective stiffening strips guided in a manner shiftable longitudinally in vehicle-mounted guide tracks. A pull-out profile extends transversely with respect to the longitudinal shifting direction of the fabric and is connected to an end region thereof. The pull-out profile is guided in the vehicle-mounted guide tracks by guide elements, and each stiffening strip is fastened on the end side to a respective guide element. Each stiffening strip has at least three receptacles provided one behind another in the longitudinal shifting direction, and the guide element is assigned at least three profiling portions spaced apart from one another in the longitudinal shifting direction and projecting into the receptacles in a form-fitting manner transversely with respect to the longitudinal shifting direction.

16 Claims, 4 Drawing Sheets

(58) Field of Classification Search
USPC .......... 160/313, 314, 315, 368.1, 369, 30.1, 160/370.22, 371
See application file for complete search history.

(56) References Cited

U.S. PATENT DOCUMENTS

| | | |
|---|---|---|
| 9,038,699 B2 | 5/2015 | Bergmiller et al. |
| 2008/0142172 A1* | 6/2008 | Hansen ................ B60J 7/0015 160/270 |
| 2009/0195034 A1 | 8/2009 | Lin |
| 2011/0067826 A1* | 3/2011 | Uehara ................ B60J 7/0015 160/314 |

FOREIGN PATENT DOCUMENTS

| | | |
|---|---|---|
| DE | 10 2012 219 523 A1 | 4/2014 |
| DE | 10 2014 005 476 A1 | 10/2015 |
| EP | 0 478 156 A1 | 4/1992 |
| EP | 1 415 836 A1 | 5/2004 |

OTHER PUBLICATIONS

Extended European Search Report issued in Application No. 18177327.6 with English translation of category of cited documents, dated Dec. 13, 2018 (9 pages).

\* cited by examiner

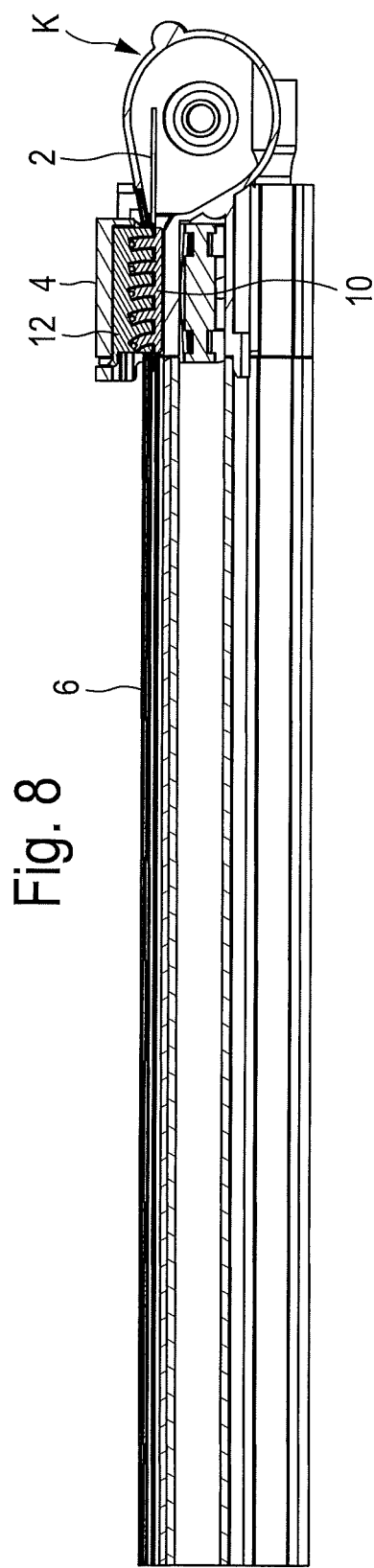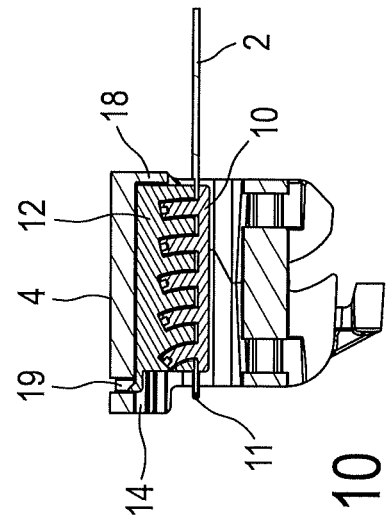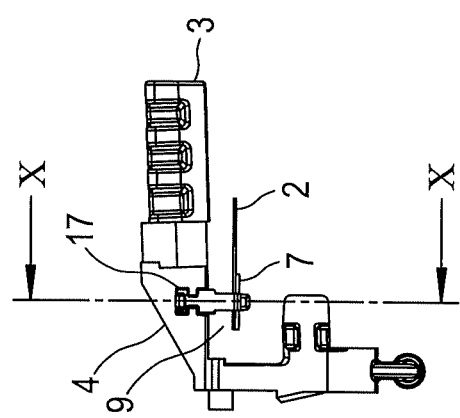

PROTECTIVE DEVICE FOR A VEHICLE INTERIOR

CROSS-REFERENCE TO RELATED APPLICATIONS

This claims priority from German Application No. 10 2017 211 784.2, filed on Jul. 10, 2017, the disclosure of which is hereby incorporated by reference in its entirety.

FIELD, BACKGROUND AND SUMMARY OF INVENTION

The invention relates to a protective device for a vehicle interior, comprising a flexible fabric which is shiftable longitudinally between different functional positions in the vehicle interior, and which is provided on opposite side edges with a respective stiffening strip, said stiffening strips being guided in a manner shiftable longitudinally in vehicle-mounted guide tracks, and comprising a pull-out profile which extends transversely with respect to the longitudinal shifting direction of the fabric and is connected to an end region of the fabric that is at the front in the pull-out direction, wherein the pull-out profile is guided in the vehicle-mounted guide tracks by means of one guide element in each thereof, and wherein each stiffening strip is fastened on the end side to a respective guide element.

A protective device of this type in the form of a shading device for a glass roof region of a vehicle interior of a passenger vehicle is generally known. A flexible fabric in the form of a shading web is held on a winding shaft in a manner such that it can be wound up and unwound. The shading web is provided with a respective stiffening strip on its opposite side edges. The stiffening strips are guided in a longitudinally displaceable manner in roof-mounted guide profilings. In addition, each stiffening strip is fastened on the end side to a guide element which is guided in a longitudinally displaceable manner in the respective roof-mounted guide profiling. A pull-out profile is coupled to the guide elements, extends transversely with respect to the longitudinal shifting direction of the shading web and is fastened on the end side to the shading web.

It is the object of the invention to provide a protective device of the type mentioned at the beginning which permits an improved connection of the stiffening strips to the guide elements.

This object is achieved in that each stiffening strip has at least three receptacles which are provided one behind another in the longitudinal shifting direction, and in that the guide element is assigned at least three profiling portions which are spaced apart from one another in the longitudinal shifting direction and project into the receptacles in a form-fitting manner transversely with respect to the longitudinal shifting direction. The at least three profiling portions which are spaced apart from one another in the longitudinal shifting direction permit an improved connection between the respective guide element and the end region of the stiffening strip. An unintentional detaching of the stiffening strip from the guide element is thereby avoided. The solution according to the invention permits an improved and low-wear fastening of the stiffening strips in comparison to the prior art. This provides for increased functional reliability of the protective device. The protective device according to the invention can be provided for shading transparent areas of the vehicle interior, such as in particular a transparent glass roof region, a rear window, side windows or the like. Alternatively, the protective device according to the invention can be provided for separating off and/or covering a luggage compartment of the vehicle interior. The receptacles provided one behind another in the longitudinal shifting direction can be configured as at least partially closed depressions; sides or as passages which are open to the opposite passages. If they are configured as depressions, said depressions can be designed in the form of impressions or the like. The profiling portions are preferably designed in respect of their cross section in a complementary manner with respect to corresponding free cross sections of the receptacles in order to permit an at least substantially play-free plugging of the profiling portions into the receptacles.

In a refinement of the invention, the profiling portions are arranged on a holding part which is connected to the guide element. The profiling portions are preferably integrally formed on the holding part. The holding part is advantageously produced from plastic. The profiling portions protrude to one side from the holding part. When the refinement is used for a protective device for shading a glass roof region, the holding part is preferably in each case positioned in the region of a lower side of the respective stiffening strip and the profiling portions protrude upward through the receptacles of the stiffening strip.

In a further refinement of the invention, the profiling portions are of pin-shaped design, and the receptacles in the stiffening strip are configured as passages which have complementary passage cross sections to the pin-shaped profiling portions.

In a further refinement of the invention, the pin-shaped profiling portions and the passages each have circular cross sections. The circular cross sections can be produced in a simple manner and permit an at least substantially play-free contact connection between profiling portions and passages. In an advantageous manner, the pin-shaped profiling portions are arranged one behind another in a row in the longitudinal shifting direction. The profiling portions advantageously extend in a common plane which runs orthogonally and along a surface of the respective stiffening strip.

In a further refinement of the invention, the holding part has a connecting portion for securing the holding part on the guide element. The holding part is a component which is separate from the respective guide element. The holding part and the respective end region of the stiffening strip are preferably connected to each other in a preassembly step before the holding part is subsequently connected to the guide element. The connecting portion is preferably designed in such a manner that a tool-free connection of the holding part to the guide element is made possible.

In a further refinement of the invention, the guide element is provided with a receiving profiling for fastening the connecting portion to the guide element. In an advantageous refinement, the receiving profiling is configured as a plug-in groove, and the connecting portion has a plug-in contour which is complementary to the plug-in groove. The plug-in groove is advantageously open to an end side of the guide element that is directed in the longitudinal shifting direction. As a result, the connecting portion of the holding part can be plugged into the plug-in groove via the open end side. Accordingly, the plug-in groove advantageously extends in the longitudinal shifting direction. For installation of the protective device, first of all the holding part is connected to the passages of the stiffening strip in a form-fitting manner and the holding part is then plugged with its connecting portion into the receiving profiling of the guide element.

In a further refinement of the invention, at least one elastically flexible latching element is provided on the connecting portion or the receiving profiling and secures the connecting portion in the plug-in groove in a form-fitting manner in the plugged-in end position. The plug-in groove preferably has, in the plugging-in direction, an end stop against which the connecting portion of the holding part strikes upon being plugged into the plug-in groove. The elastically flexible latching element is configured in such a manner that it latches into its latching position as soon as the connecting portion has reached its plugged-in end position in the plug-in groove. For this purpose, the plug-in groove preferably has a latching profiling which is complementary to the latching element and into which the elastically flexible latching element latches in the end position of the connecting portion.

In a further refinement of the invention, the holding part has two partial regions which, in the mounted state, flank the stiffening strip on both sides. The two partial regions of the holding part can be separate from each other or connected movably to each other. The two partial regions are preferably produced from plastic. The stiffening strip can be designed as a flat steel strip or as a fiber-reinforced plastic strip, in particular as a Teflon strip.

In a further refinement of the invention, the partial regions are connected to each other in an articulated manner by means of a hinge. The hinge preferably defines a pivot axis which runs transversely with respect to the longitudinal shifting direction of the stiffening strip, but in or parallel to a plane of the stiffening strip. The hinge is preferably configured as a film hinge.

In a further refinement of the invention, the pin-shaped profiling portions and the plug-in receptacles are curved in the same direction in a common plane. The common plane is preferably formed by a radial plane of the pivot axis of the hinge.

In a further refinement of the invention, the profiling portions and the plug-in receptacles are correspondingly curved in the shape of a circular arc by different circular arcs which have a common center point, namely a pivot axis of the hinge, in the common plane and the radii of which correspond to the distances of the respective profiling portions or plug-in receptacles from the center point. As a result, when the two partial regions of the holding part are pivoted in relation to each other, it is ensured that the profiling portions enter exactly into the plug-in receptacles with the loading being substantially constant. In an advantageous manner, the profiling portions and the complementary plug-in receptacles are provided on the end sides with latching profilings in order to permit latching, and accordingly securing, of the profiling portions in the plug-in receptacles in the joined-together end position of the two partial regions of the holding part.

BRIEF DESCRIPTION OF THE DRAWINGS

Further advantages and features of the invention emerge from the claims and from the description below of a preferred exemplary embodiment of the invention that is illustrated with reference to the drawings.

FIG. 8 shows a longitudinal sectional illustration of the protective device according to FIG. 3, FIG. 9 schematically shows a front view of a guide element of the protective device according to FIG. 8, and FIG. 10 shows a section along the intersecting line X-X of the illustration according to FIG. 9.

DETAILED DESCRIPTION

Figure 1:
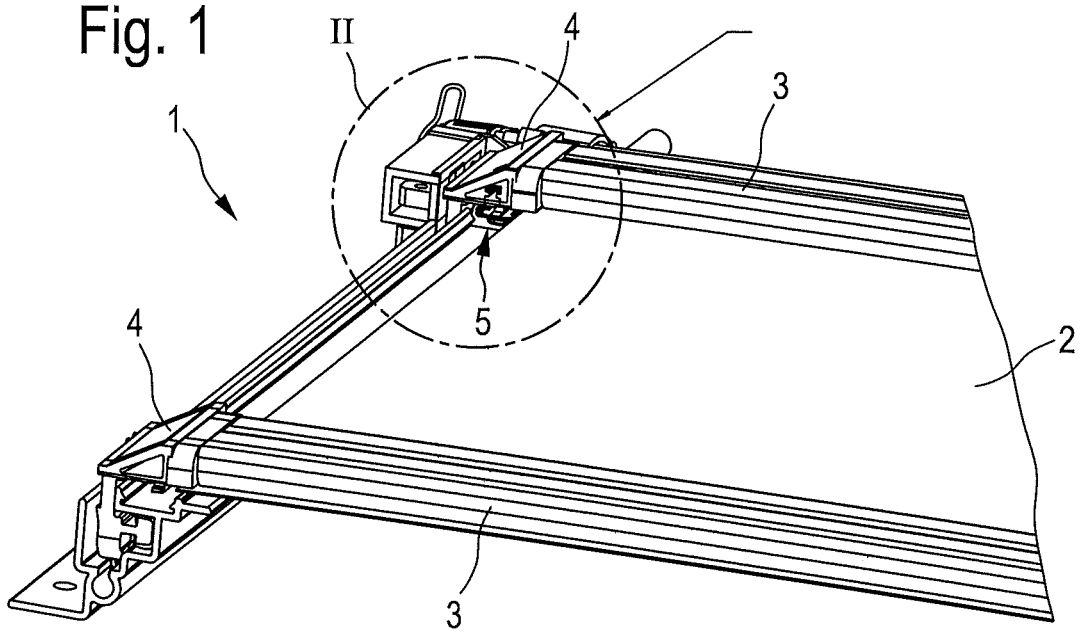
FIG. 1 shows a detail of an embodiment of a protective device according to the invention in the form of a shading system for a glass roof region of a passenger vehicle.
Figure 2:
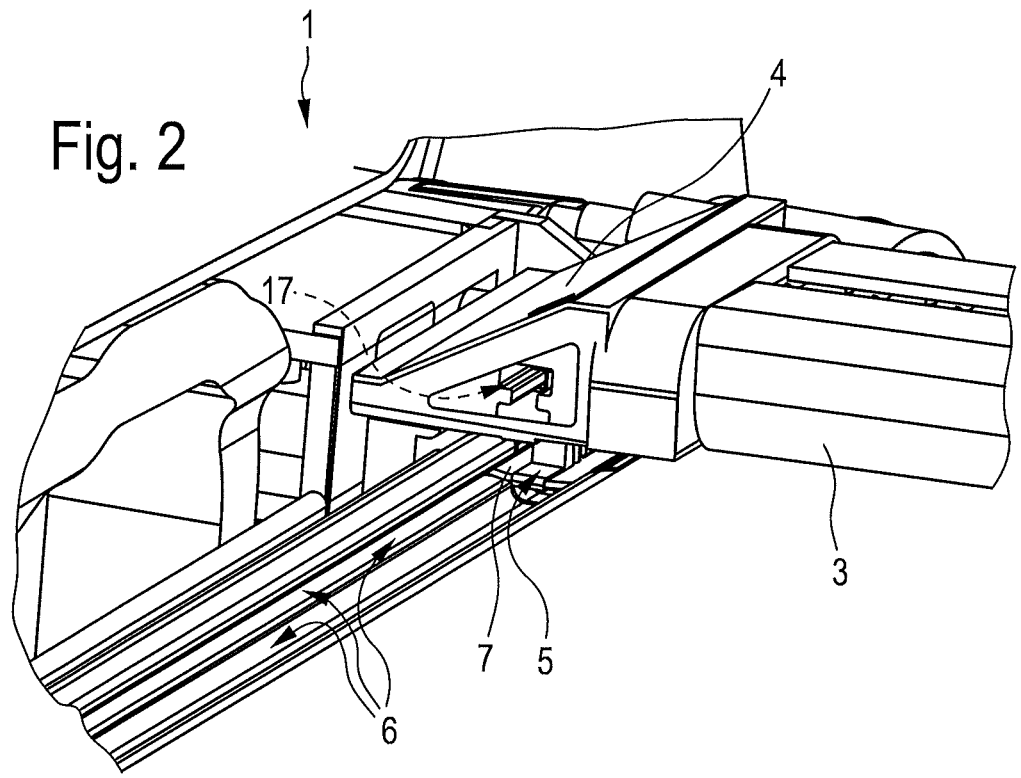
FIG. 2 shows a detail II of the illustration according to FIG. 1, but in enlarged form.
Figure 3:
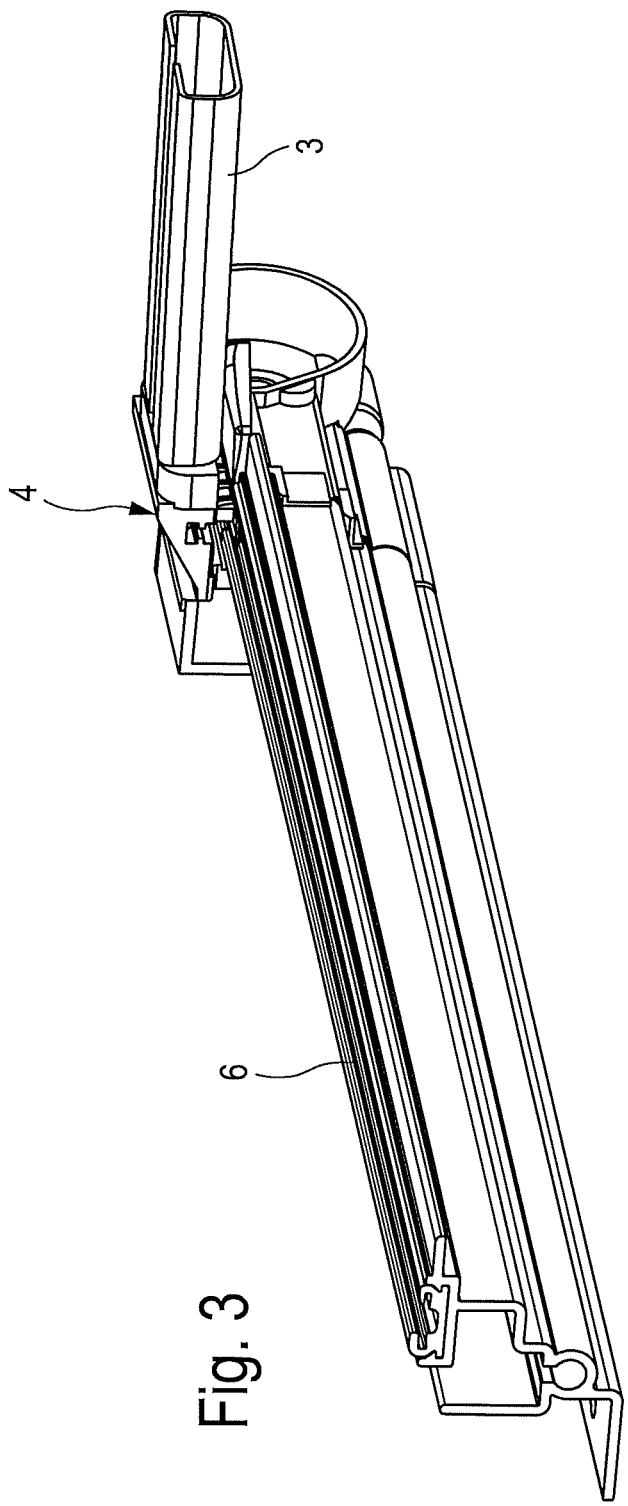
FIG. 3 shows, in a perspective illustration, a partial region of the protective device according to FIGS. 1 and 2.
Figure 4:
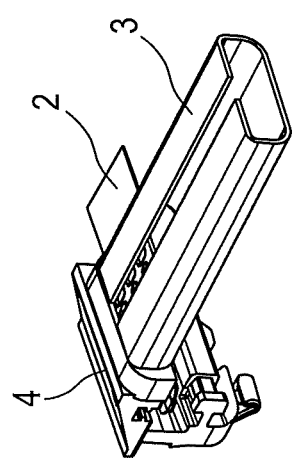
FIG. 4 shows, in an enlarged illustration, a partial region of the protective device according to FIG. 3.

A protective device 1 according to FIGS. 1 to 10 is provided as a shading device for a glass roof region of a passenger vehicle. The shading device is provided in the vehicle interior below the glass roof region and has a flexible fabric 2 which is also referred to as a shading web. The flexile fabric 2 is held on a winding shaft in a manner such that it can be wound up and unwound, the winding shaft being mounted rotatably in a cassette housing K mounted on the roof (FIG. 8). The flexible fabric 2 is provided on its opposite side edges with a respective stiffening strip 7 which is guided in a longitudinally displaceable manner in a guide track which is in each case mounted on the roof and therefore mounted on the vehicle and is in the form of a guide rail 6. Only one of the roof-mounted guide rails 6 is shown with reference to FIGS. 1 to 10. An opposite side of the protective device 1 including the guide rail 6 is configured mirror-symmetrically relative to a vertical center longitudinal axis, but otherwise identically. In order to avoid repetitions, only the one side is described below with reference to the drawings according to FIGS. 1 to 10. The same applies equivalently to the opposite side.

The flexible fabric 2 is shiftable along the guide rails 6 between an inoperative position, i.e. a first functional position, wound up onto the winding shaft and a second functional position pulled out as far as an end region of the guide rails 6. The two stiffening strips 7, which are assigned to the opposite side edges of the flexible fabric 2 and are guided in the vehicle-mounted guide rails 6, serve to exert a permanent transverse stress on the flexible fabric 2 transversely with respect to the longitudinal shifting direction. This avoids sagging of the flexible fabric 2. The flexible fabric 2 is connected on its end region that is at the front in the pulling-out direction to a dimensionally stable pull-out profile 3 which extends in the transverse direction over the width of the fabric 2. The pull-out profile 3 is illustrated in two different positions with reference to FIG. 1. The pull-out profile 3 is coupled at its opposite ends to a respective guide element 4 which is guided in a longitudinally displaceable manner in the respective guide rail 6. In the exemplary embodiment illustrated, the guide element 4 is shiftable longitudinally in the respective guide rail 6 by means of a drive system. A longitudinal shifting of the pull-out profile 3 and therefore of the guide elements 4 can take place in the same manner, but also manually by corresponding grasping of the pull-out profile 3 and displacing same along the guide rail 6.

The respective stiffening strip 7 is connected fixedly to the guide element 4 in order to be able to be carried along by the guide element 4. The stiffening strip 7 is designed as a flat strip and is produced from steel or a fiber-reinforced plastic strip. The stiffening strip 7 is wound together with the flexible fabric in the region of the cassette housing K onto the winding shaft and is pulled off therefrom. The stiffening strip 7 projects at its end region that is at the front in the pulling-out direction beyond the flexible fabric 2 (see FIGS. 5 to 7). In this region, the stiffening strip 7 is perforated by a total of five holes which constitute passages 8 within the meaning of the invention. The passages 8 are configured identically to one another and are arranged one behind another at uniform distances in a row. All of the passages 8 are of circular design and are preferably produced by punching. The front end region of the stiffening strip 7 is connected in a manner described in more detail below to a holding part 9 which is subsequently fitted into a receiving profiling 17 of the guide element 4. The holding part 9 consists of an upper partial region 12 and a lower partial region 10 which are connected pivotably to each other via a film hinge 11. A pivot axis formed by the film hinge 11 extends parallel to a transverse extent of the pull-out profile 3. The lower partial region 10 is provided with a total of five pin-shaped profiling portions 16 which protrude toward a common side from the strip-shaped partial region 10. In the illustration according to FIGS. 5 and 6, the pin-shaped profiling portions 16 protrude downward.

The upper partial region 12 has five plug-in receptacles 15 in a complementary manner to the pin-shaped profiling portions 16, said plug-in receptacles at least partially having plug-in cross sections which are complementary to the cross sections of the pin-shaped profiling portions 16.

Figure 5:
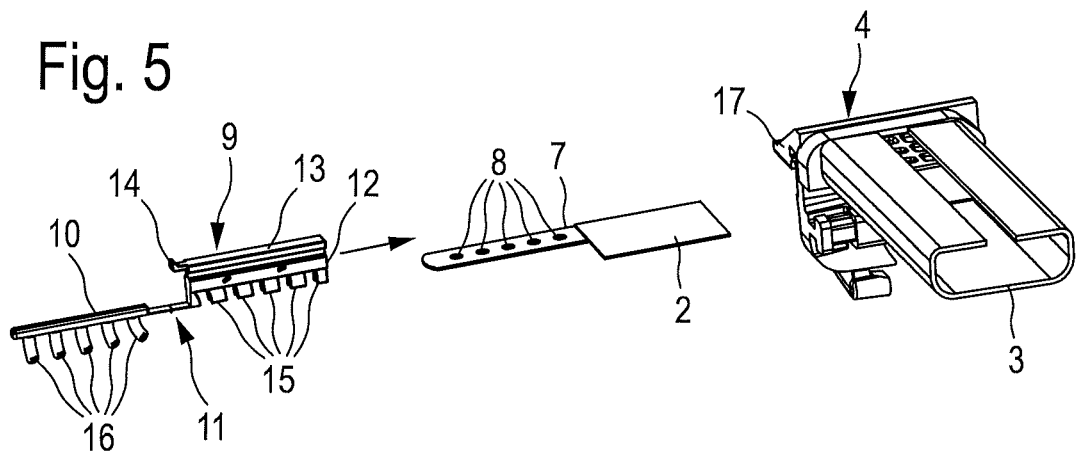
FIG. 5 shows a first installation step for connecting a guide element to a flexible fabric according to FIG. 4.
Figure 6:
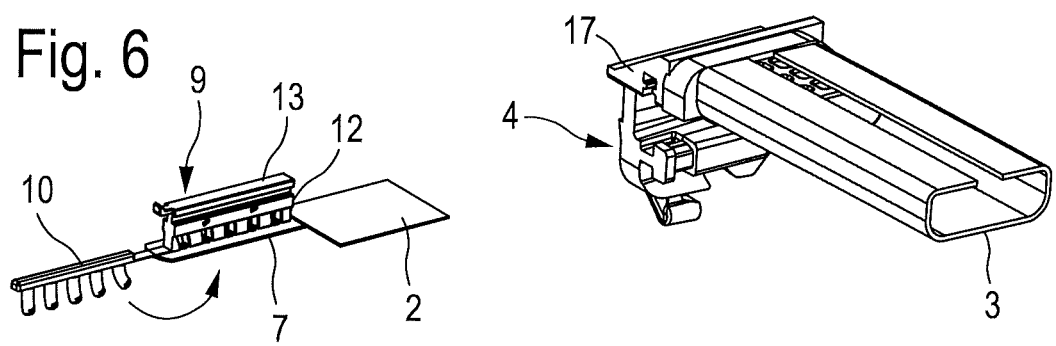
FIG. 6 shows a further installation step following FIG. 5.
Figure 7:
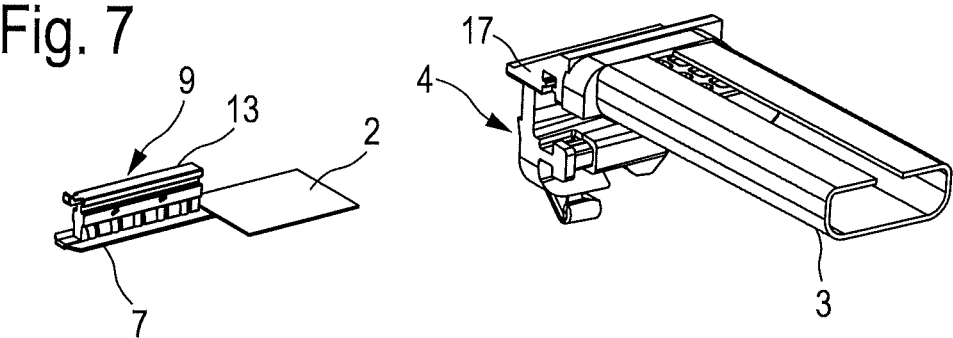
FIG. 7 shows a further installation step following FIG. 6.

As can be seen with reference to FIGS. 5 to 7, for the connection of the holding part 9 to the stiffening strip 7, first of all the upper partial region 12 is placed onto the front end region of the stiffening strip 7 until the plug-in receptacles 15 align with the passages 8. In this position (FIG. 6), the film hinge 11 is approximately level with a front end edge of the stiffening strip 7. Subsequently, the lower partial region 10, which still extends forward in the manner of a tongue from the upper partial region 12, is pivoted downward in accordance with the arrow depiction in FIG. 6, as a result of which the five pin-shaped profiling portions 16 enter successively through the passages 8, which are arranged one behind another, and enter into the plug-in receptacles 15.

It can be seen with reference to FIG. 10 that the plug-in receptacles 15 and the pin-shaped profiling portions 16 are extended in a radial plane with respect to the pivot axis which is formed by the film hinge 11. In addition, it can be seen with reference to FIG. 10 that all of the pin-shaped profiling portions 16 and the associated plug-in receptacles 15 are curved in the shape of a circular arc. The circular arcs here have different radii which correspond to the different distances of the individual pin-shaped profiling portions 16 from the pivot axis formed by the film hinge 11. Accordingly, the curvature of the pin-shaped profiling portions and of the associated plug-in receptacles in the shape of a circular arc decreases in relation to the distance at which the individual profiling portions and plug-in receptacles are from the pivot axis of the film hinge 11. The tongue which forms the film hinge 11 extends around the front end edge of the stiffening strip 7 in the completely mounted state of the holding part 9 (see FIGS. 7 and 10). The pin-shaped profiling portions 16 are either held purely in a force-fitting manner in the plug-in receptacles 15, or the profiling portions 16 and the complementary plug-in receptacles 15 are assigned additional latching profilings (not illustrated specifically) which secure the plugged-in end position of profiling portions 16 and plug-in receptacles 15. Since, in addition, the profiling portions 16 are plugged in a form-fitting manner through the passages 8 of the stiffening strip 7, the holding part 9 is fixedly connected to the stiffening strip 7.

In the upper partial region 12, the holding part 9 is additionally provided with a connecting portion 13 which is configured as a substantially T-shaped profile. In a complementary manner with respect thereto, the guide element 4 has the receiving profiling 17 which is provided with a complementary T-shaped plug-in groove which is open forward in the pulling-out direction. On the rear side, the receiving profiling 17 is provided with a rear wall 18 serving as an end stop. The holding part 9 is pushed with its connecting portion 13 into the receiving profiling 17, configured as a plug-in groove, of the guide element 4 in parallel to the direction of extent of the stiffening strip 7 until the connecting portion 13 comes into contact on the end side with the rear wall 18. In addition, the connecting portion 13 is provided with an elastically flexible latching lug 14 which, in the plugged-in end position of the connecting portion 13, latches into a latching groove 19 of the guide element 4 (see in particular FIG. 10). The holding part 9 is therefore firstly plugged into the guide element 4 in a force-fitting and play-free manner and is additionally secured in the latching groove 19 of the guide element 4 in a form-fitting manner via the latching lug 14. The form-fitting support in the opposite direction is taken on by the rear wall 18.

Accordingly, a longitudinal shifting of the guide element 4 inevitably leads to a corresponding longitudinal shifting of the stiffening strip 7 and accordingly to a longitudinal shifting of the flexible fabric 2.

The invention claimed is:

1. A protective device for a vehicle interior, comprising a flexible fabric shiftable longitudinally between different functional positions in the vehicle interior, the flexible fabric being provided on opposite side edges thereof with a respective stiffening strip, said stiffening strips being guided in a longitudinally shiftable manner in vehicle-mounted guide tracks, the protective device further comprising a pull-out profile extending transversely with respect to a longitudinal shifting direction of the flexible fabric and connected to an end region of the flexible fabric disposed at a front thereof in a pull-out direction, the pull-out profile being guided in the vehicle-mounted guide tracks by one guide element disposed in each vehicle-mounted guide track, each stiffening strip being fastened to a respective guide element, each stiffening strip having at least three receptacles provided one behind another in the longitudinal shifting direction, each guide element being assigned at least three profiling portions spaced apart from one another in the longitudinal shifting direction and projecting into the receptacles in a form-fitting manner transversely with respect to the longitudinal shifting direction, the profiling portions and the receptacles each having circular cross-sections, and the protective device further comprising a holding part connected to each guide element and on which holding part the profiling portions are arranged.

2. The protective device according to claim 1, wherein the profiling portions are configured as pins and the receptacles in the stiffening strip are configured as passages with passage cross-sections complementary to cross-sections of the pins.

3. The protective device according to claim 1, wherein the profiling portions are arranged one behind another in a row in the longitudinal shifting direction.

4. The protective device according to claim 1, wherein the profiling portions are configured as pins.

5. A protective device for a vehicle interior, comprising a flexible fabric shiftable longitudinally between different functional positions in the vehicle interior, the flexible fabric being provided on opposite side edges thereof with a respective stiffening strip, said stiffening strips being guided in a longitudinally shiftable manner in vehicle-mounted guide tracks, the protective device further comprising a pull-out profile extending transversely with respect to a longitudinal shifting direction of the flexible fabric and connected to an end region of the flexible fabric disposed at a front thereof in a pull-out direction, the pull-out profile being guided in the vehicle-mounted guide tracks by one guide element disposed in each vehicle-mounted guide track, each stiffening strip being fastened to a respective guide element, each stiffening strip having at least three receptacles provided one behind another in the longitudinal shifting direction, each guide element being assigned at least three profiling portions spaced apart from one another in the longitudinal shifting direction and projecting into the receptacles in a form-fitting manner transversely with respect to the longitudinal shifting direction, the protective device further comprising holding parts each having a connecting portion for securing each holding part on a respective one of the guide elements, each guide element being provided with a receiving profiling for fastening the connecting portion of the respective holding part to the guide element, each receiving profiling being configured as a plug-in groove, and the connecting portion of the respective holding part having a plug-in contour complementary to the plug-in groove.

6. A protective device for a vehicle interior, comprising a flexible fabric shiftable longitudinally between different functional positions in the vehicle interior, the flexible fabric being provided on opposite side edges thereof with a respective stiffening strip, said stiffening strips being guided in a longitudinally shiftable manner in vehicle-mounted guide tracks, the protective device further comprising a pull-out profile extending transversely with respect to a longitudinal shifting direction of the flexible fabric and connected to an end region of the flexible fabric disposed at a front thereof in a pull-out direction, the pull-out profile being guided in the vehicle-mounted guide tracks by one guide element disposed in each vehicle-mounted guide track, each stiffening strip being fastened to a respective guide element, each stiffening strip having at least three receptacles provided one behind another in the longitudinal shifting direction, each guide element being assigned at least three profiling portions spaced apart from one another in the longitudinal shifting direction and projecting into the receptacles in a form-fitting manner transversely with respect to the longitudinal shifting direction, the protective device further comprising holding parts each having a connecting portion for securing each holding part on a respective one of the guide elements, each guide element being provided with a receiving profiling for fastening the connecting portion of the respective holding part to the guide element, and at least one elastically flexible latching element is provided on each connecting portion or on each receiving profiling and secures the respective connecting portion in the receiving profiling in a form-fitting manner in a plugged-in end position.

7. The protective device according to claim 1, wherein each holding part has two partial regions which, in a mounted state, flank the respective stiffening strip on opposite sides thereof.

8. The protective device according to claim 7, wherein the partial regions of each holding part are connected to each other in an articulated manner by a hinge.

9. The protective device according to claim 8, wherein each hinge is configured as a film hinge.

10. The protective device according to claim 7, wherein the profiling portions are configured as pins and one partial region of each holding part is provided with the pins and the other partial region is provided with the receptacles, the receptacles being configured as plug-in receptacles in which the pins are engaged in a form-fitting manner.

11. The protective device according to claim 10, wherein the pins and the plug-in receptacles are curved in a same direction in a common plane.

12. The protective device according to claim 11, wherein the pins and the plug-in receptacles are correspondingly curved in a shape of a circular arc by different circular arcs having a common center point in the common plane and radii of the circular arcs correspond to distances of the respective pins or the respective plug-in receptacles from the common center point.

13. The protective device according to claim 12, wherein the partial regions of each holding part are connected to each other in an articulated state by a hinge, and the common center point coincides with a pivot axis of the hinge.

14. A protective device for a vehicle interior, comprising a flexible fabric shiftable longitudinally between different functional positions in the vehicle interior, the flexible fabric being provided on opposite side edges thereof with a respective stiffening strip, said stiffening strips being guided in a longitudinally shiftable manner in vehicle-mounted guide tracks, the protective device further comprising a pull-out profile extending transversely with respect to a longitudinal shifting direction of the flexible fabric and connected to an end region of the flexible fabric disposed at a front thereof in a pull-out direction, the pull-out profile being guided in the vehicle-mounted guide tracks by one guide element disposed in each vehicle-mounted guide track, each stiffening strip being fastened to a respective guide element, each stiffening strip having at least three receptacles provided one behind another in the longitudinal shifting direction, each guide element being assigned at least three profiling portions spaced apart from one another in the longitudinal shifting direction and projecting into the receptacles in a form-fitting manner transversely with respect to the longitudinal shifting direction, the protective device further comprising holding parts each having a connecting portion for securing each holding part on a respective one of the guide elements, the profiling portions assigned to each guide element being formed on the holding part connected thereto, the profiling portions being configured as pins and the receptacles being configured as passages, and the pins having cross-sections complementary to cross-sections of the passages.

15. A protective device for a vehicle interior, comprising a flexible fabric shiftable longitudinally between different functional positions in the vehicle interior, the flexible fabric being provided on opposite side edges thereof with a respective stiffening strip, said stiffening strips being guided in a longitudinally shiftable manner in vehicle-mounted guide tracks, the protective device further comprising a pull-out profile extending transversely with respect to a longitudinal shifting direction of the flexible fabric and connected to an end region of the flexible fabric disposed at a front thereof in a pull-out direction, the pull-out profile being guided in the vehicle-mounted guide tracks by one guide element disposed in each vehicle-mounted guide track, each stiffening strip being fastened to a respective guide element and having at least three receptacles provided one behind another in the longitudinal shifting direction, each guide element being assigned at least three profiling portions spaced apart from one another in the longitudinal shifting direction and projecting into the receptacles in a form-fitting manner transversely with respect to the longitudinal shifting direction, the protective device further comprising a holding part connected to each guide element and on which holding part the profiling portions are arranged, each holding part having two partial regions which, in a mounted state, flank the respective stiffening strip on opposite sides thereof.

16. The protective device according to claim 15, wherein the partial regions of each holding part are connected to each other in an articulated manner by a film hinge.

* * * * *